US009521065B1

(12) United States Patent
Nuji (10) Patent No.: US 9,521,065 B1
(45) Date of Patent: Dec. 13, 2016

(54) ENHANCED VLAN NAMING (71) Applicant: EMC Corporation, Hopkinton, MA (US)

(72) Inventor: Ranjith Kumar Nuji, Karnataka (IN)

(73) Assignee: EMC IP Holding Company LLC, Hopkinton, MA (US)

(*) Notice: Subject to any disclaimer, the term of this patent is extended or adjusted under 35 U.S.C. 154(b) by 243 days.

(21) Appl. No.: 13/922,325

(22) Filed: Jun. 20, 2013

(51) Int. Cl.
H04L 12/28 (2006.01)
H04L 12/751 (2013.01)
H04L 12/715 (2013.01)
H04L 12/721 (2013.01)
H04L 12/24 (2006.01)

(52) U.S. Cl.
CPC .............. H04L 45/02 (2013.01); H04L 41/12 (2013.01); H04L 45/04 (2013.01); H04L 45/12 (2013.01)

(58) Field of Classification Search
CPC .......... H04L 41/12; H04L 41/04; H04L 45/02; H04L 45/04; H04L 45/48; H04L 45/021; H04L 47/122; H04L 12/803; H04L 12/751
See application file for complete search history.

(56) References Cited

U.S. PATENT DOCUMENTS

| | | | |
|---|---|---|---|
| 7,292,577 B1* | 11/2007 | Ginipalli et al. | 370/395.1 |
| 7,480,258 B1* | 1/2009 | Shuen | H04L 45/00 370/217 |
| 7,606,939 B1* | 10/2009 | Finn | H04L 12/4645 709/246 |
| 8,599,858 B1* | 12/2013 | Mizrahi | 370/395.31 |
| 2004/0174887 A1* | 9/2004 | Lee | 370/395.53 |
| 2005/0013260 A1* | 1/2005 | Ramanathan | H04L 12/4625 370/256 |
| 2005/0163102 A1* | 7/2005 | Higashitaniguchi et al. | 370/351 |
| 2006/0056297 A1* | 3/2006 | Bryson et al. | 370/230 |
| 2007/0127414 A1* | 6/2007 | Sridhar et al. | 370/331 |
| 2007/0230481 A1* | 10/2007 | Ikeda et al. | 370/395.53 |
| 2007/0286208 A1* | 12/2007 | Kanada et al. | 370/395.53 |
| 2008/0239946 A1* | 10/2008 | Morita | 370/217 |
| 2010/0322251 A1* | 12/2010 | Li | 370/395.53 |
| 2011/0090911 A1* | 4/2011 | Hao et al. | 370/395.53 |
| 2013/0254356 A1* | 9/2013 | Eastlake, III | H04L 45/74 709/220 |

(Continued)

OTHER PUBLICATIONS

EMC Corporation, "VLAN Tagging and Routing on EMC CLARiiON," White paper H6634.1, Oct. 2009, 19 pp.

Primary Examiner — Ian N Moore
Assistant Examiner — Phong La
(74) Attorney, Agent, or Firm — Muirhead and Saturnelli, LLC (57) ABSTRACT Providing unique VLAN names in a system containing a plurality of networks includes obtaining, for at least one of the networks, a unique identifier associated with each of the networks, obtaining a VLAN ID for at least one of the VLANs in the at least one of the networks, and forming a unique VLAN name by concatenating the unique identifier to the VLAN ID. The unique identifier may be associated with each of the networks is a root bridge ID for a root bridge associated with each of the networks. In response to a root bridge becoming non-operational, a new root bridge may be determined and the unique VLAN name may be changed to remove the old root bridge ID and to include the new root bridge ID. In response to a change in topology, a new root bridge may be determined.

10 Claims, 6 Drawing Sheets (56) References Cited

U.S. PATENT DOCUMENTS

2014/0123135 A1* 5/2014 Huang et al. .................. 718/1
2014/0362706 A1* 12/2014 Lee .............................. 370/238
2015/0016262 A1* 1/2015 Friskney et al. ............. 370/235

* cited by examiner

ENHANCED VLAN NAMING

BACKGROUND OF THE INVENTION

1. Technical Field

This application relates to the field of data communication, and more particularly to the field of digital data communications using networks.

2. Description of Related Art

A Virtual LAN (VLAN) is created on Layer 2 switches to control broadcasts and enforce the use of a Layer 3 device for communications. A VLAN may be maintained in a database of a local switch. If a VLAN is not known to a switch, the switch cannot transfer traffic across any of its ports for that VLAN. By using VLANs, the same user can be spread out over various geographical locations and still remain in a particular IP subnet.

A VLAN ID is an identification of the VLAN, which is used in connection with the 802.1Q standard that governs deployment of VLANs. The VLAN ID, which is used to identify which frame belongs to which VLAN, has twelve bits and thus allows the identification of 4096 ($2^{12}$) VLANs. Of the 4096 possible VLAN IDs, a VLAN ID of zero is used to identify priority frames and a VLAN ID of 4095 (0xFFF) is reserved. Accordingly, a maximum number of possible unique VLAN IDs is 4,094.

A network management system may be used to discover components for multiple networks, each of which may have its own set of VLAN IDs used within the network. However, given the limited number of unique VLAN IDs, multiple networks may use the same VLAN IDs or VLAN numbers. When the network management system tries to discover VLANs in multiple networks having the same VLAN IDs, the system may not be able to uniquely discover VLANs having the same ID and thus may not be able to manage the VLAN IDs across all of the different networks being managed. One way to address this is to have a user provide unique identifiers for each network, but this may not be practical and probably will not result in consistent naming conventions.

Accordingly, it is desirable to provide a mechanism that automatically and consistently discovers VLAN IDs for VLANs in multiple networks in a way that avoids overlap of VLAN IDs.

SUMMARY OF THE INVENTION

According to the system described herein, providing unique VLAN names in a system containing a plurality of networks includes obtaining, for at least one of the networks, a unique identifier associated with each of the networks, obtaining a VLAN ID for at least one of the VLANs in the at least one of the networks, and forming a unique VLAN name by concatenating the unique identifier to the VLAN ID. The unique identifier may be associated with each of the networks is a root bridge ID for a root bridge associated with each of the networks. In response to a root bridge becoming non-operational, a new root bridge may be determined and the unique VLAN name may be changed to remove the old root bridge ID and to include the new root bridge ID. In response to a change in topology, a new root bridge may be determined. In response to a value for the new root bridge being less than a value for the old root bridge, the unique VLAN name may be changed to remove the old root bridge ID and to include the new root bridge ID. A unique VLAN name may be provided for all of the VLANs in the system. There may be more than 4096 different discoverable VLANs in the system. Each of the networks may include less than 4096 VLANs.

According further to the system described herein, computer software, provided in non-transitory computer-readable media, provides unique VLAN names in a system containing a plurality of networks. The software includes executable code that obtains, for at least one of the networks, a unique identifier associated with each of the networks, executable code that obtains a VLAN ID for at least one of the VLANs in the at least one of the networks, and executable code that forms a unique VLAN name by concatenating the unique identifier to the VLAN ID. The unique identifier may be associated with each of the networks is a root bridge ID for a root bridge associated with each of the networks. In response to a root bridge becoming non-operational, a new root bridge may be determined and the unique VLAN name may be changed to remove the old root bridge ID and to include the new root bridge ID. In response to a change in topology, a new root bridge may be determined. In response to a value for the new root bridge being less than a value for the old root bridge, the unique VLAN name may be changed to remove the old root bridge ID and to include the new root bridge ID. A unique VLAN name may be provided for all of the VLANs in the system. There may be more than 4096 different discoverable VLANs in the system. Each of the networks may include less than 4096 VLANs.

DETAILED DESCRIPTION OF VARIOUS EMBODIMENTS

Figure 1:
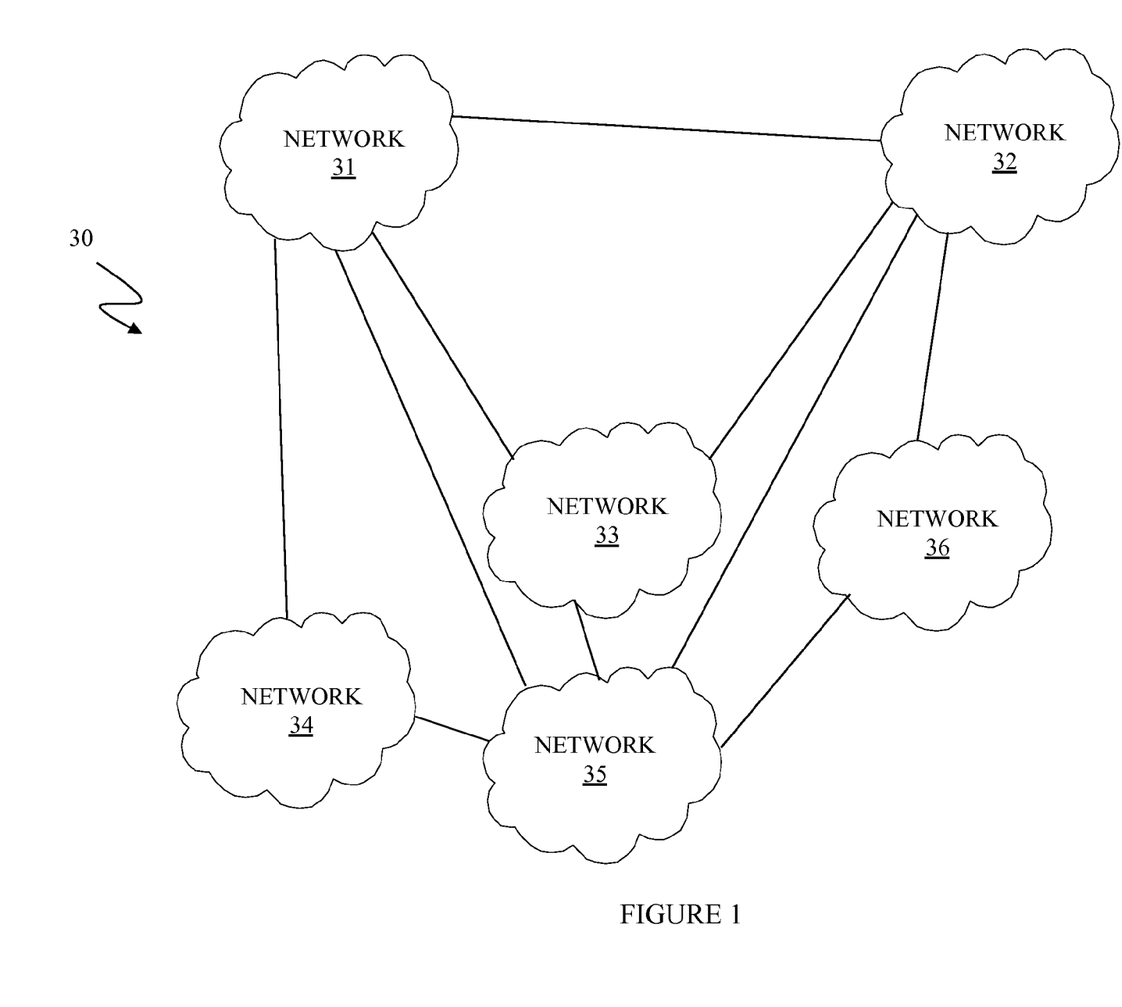
FIG. 1 is a diagram illustrating a system containing a plurality of networks according to an embodiment of the system described herein.

Referring to FIG. 1, a diagram illustrates a relatively large network 30 that includes a plurality of smaller networks 31-36. The smaller networks 31-36 represent any number of networks. Each of the networks 31-36 may correspond to one or a small number of physical locations having interconnected computing devices such as user workstations, servers, and/or one or more routers that couple each of the physical subnets 32-34 to the Internet. In some instances, devices within the each of the networks 31-36 may use private IP addresses (e.g., 192.168.x.x) that are not generally accessible through the Internet.

Each of the networks 31-36 may use a plurality of interconnected switches (not shown) for routing IP data within each of the networks and for routing data from one of the networks 31-36 to other ones of the networks 31-36. In an embodiment herein, each of the networks 31-36 may use a conventional spanning tree protocol to avoid communication loops therein. Thus, each of the networks may establish a root bridge that provides routing information to other switches therein.

In some cases, one or more of the networks 31-36 may implement VLAN functionality where devices that are on the same physical network (e.g., the same LAN) but correspond to different VLAN IDs, do not communicate so that, for example, a multicast message from one of the devices will not be received by the other one of the devices and one of the devices may not directly communicate with other one of the devices. However, in some cases switches can route VLAN traffic so that devices that are part of the same VLAN can communicate directly even if the devices do not share the same physical connection. Note that, in some instances, each VLAN within a network may be provided with a separate VLAN spanning tree (and VLAN root bridge) while, in other instances, VLAN data may be routed with all other traffic for the network using a single spanning tree for the network without using additional special VLAN spanning trees.

Figure 2:
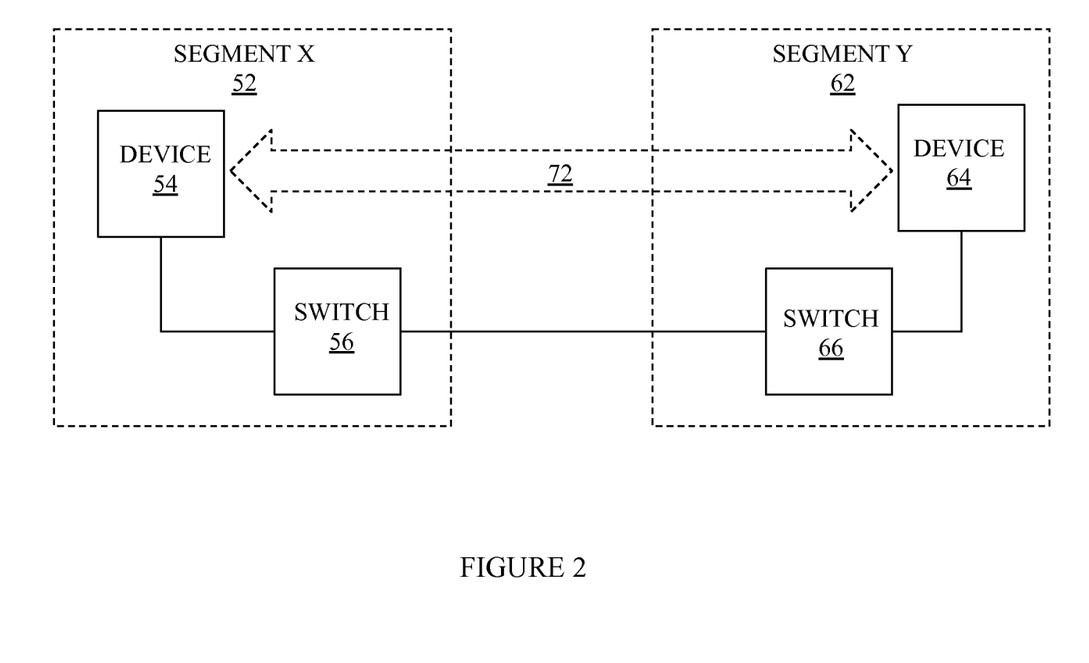
FIG. 2 is a diagram illustrating transferring data between two devices in a VLAN according to an embodiment of the system described herein.

Referring to FIG. 2, a LAN segment X 52 is shown as including a device 54 and a switch 56 coupled to the device 54. Similarly, a LAN segment Y 62 includes a device 64 and a switch 66 coupled to the device 64. The devices 54, 64 may be computer workstations or any other type of device that may communicate using the Internet Protocol. The device 54 communicates with the switch 56 using the Internet Protocol while the device 64 communicates with the switch 66 using the Internet Protocol. The switches 56, 66 communicate with each other. The devices 54, 64 may exist on the same VLAN, in which case it may be possible for the devices 54, 64 to communicate with each other using the switches 54, 64 to the exclusion of other devices (not shown) that are not on the same VLAN, as illustrated by a communication path 72. Note that, although not shown in FIG. 2, a LAN segment may include more than one switch.

Generally, data from the device 54 that is being sent to the device 64 using the VLAN is switched by the switch 56 to the switch 66 and then to the device 64. Similarly, data from the device 64 that is being sent to the device 54 using the VLAN is routed by the switch 66 to the switch 56 and then to the device 54. The switches 56, 66 contain information that facilitate VLAN communication therethrough.

Figure 3:
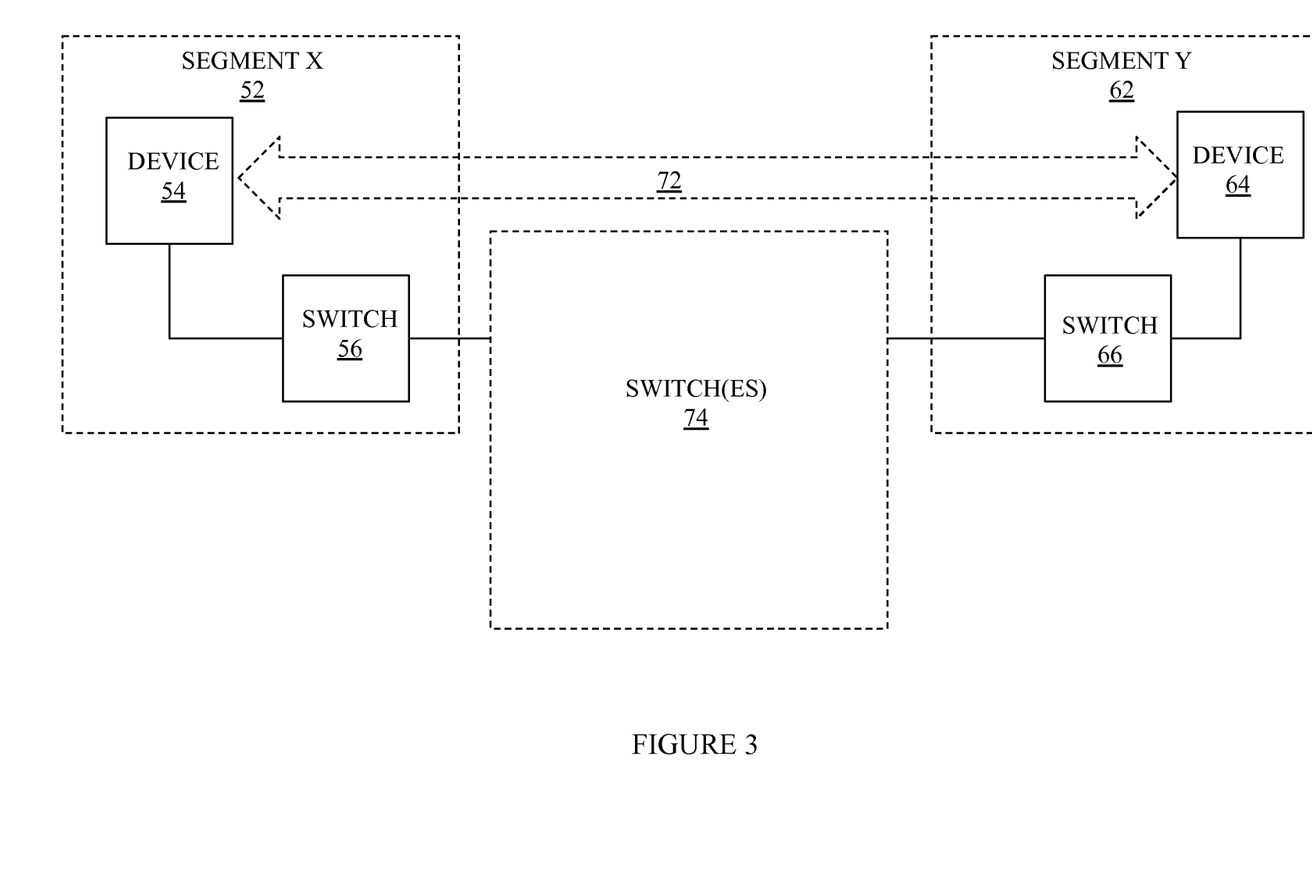
FIG. 3 is a diagram illustrating transferring data between two devices in a VLAN through a plurality of switches according to an embodiment of the system described herein.

Referring to FIG. 3, the segments 52, 62 are shown with one or more switches 74 interposed between the switch 56 and the switch 66. In such a case, the switches 56, 66 may still communication to provide VLAN communication between the devices 54, 64. However, in this case, the switches 56, 66 do not communicate directly but rather communicate through the switches 74.

Figure 4:
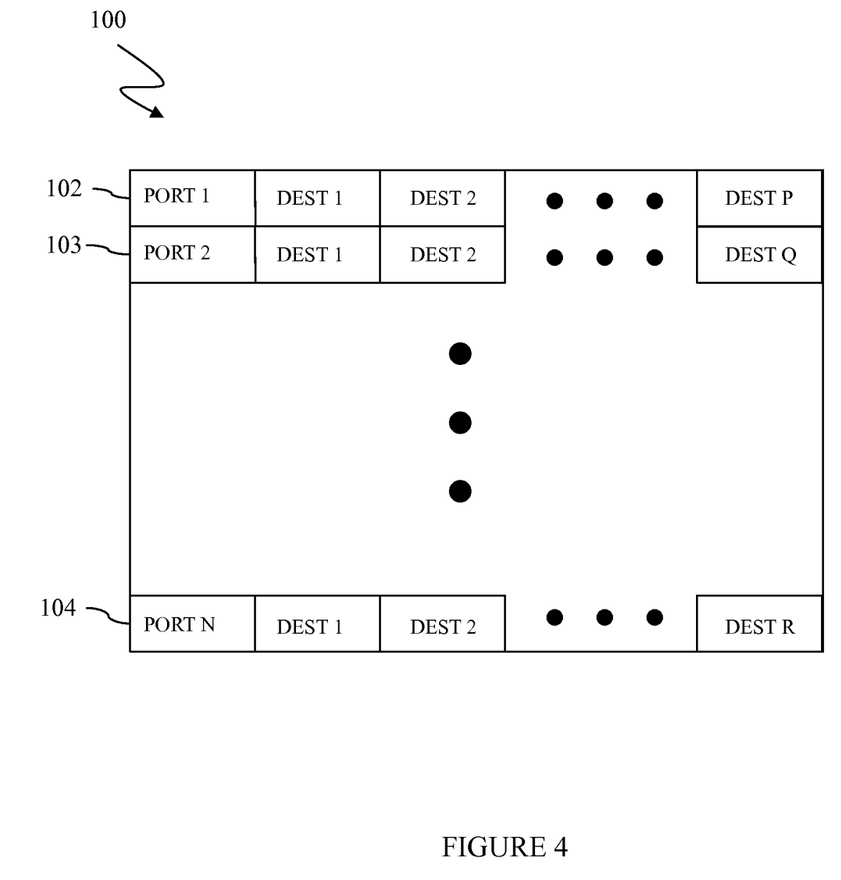
FIG. 4 is a diagram illustrating a switch table used for transferring data within a VLAN according to an embodiment of the system described herein.

Referring to FIG. 4, a routing table 100 for a switch is shown as including a plurality of entries 102-104 where each of the entries 102-104 corresponds to a port of the switch. Each of the destination fields may indicate a particular MAC address for which the corresponding port receives data. Thus, for example, if port X receives data for MAC address Y, then IP data received at the switch destined for MAC Address Y will be transmitted through port X and no other ports of the switch. When the switch receives data for an unknown MAC address, the data is retransmitted out of all of the ports of the switch except for the port on which the data was received. Of course, implementation of a spanning tree and/or VLAN functionality may restrict the ports on which data is transmitted and/or received.

Each of the networks 31-36 of FIG. 1 may have multiple VLANs, each having has a unique VLAN ID that is used to route data. A VLAN ID distinguishes data and destinations associated with one VLAN from data and destinations associated with other VLANs. Thus, for example, if two devices are on the same physical network (same LAN) but correspond to different VLAN IDs, then a multicast message from one of the devices will not be received by the other one of the devices.

Conventionally, only a limited number of VLAN IDs are possible for each of the networks 31-36. Thus, a system management tool that identifies network objects for the entire system may see VLANs in different ones of the networks 31-36 that have the same VLAN ID. For example, a VLAN in the network 31 may have an ID of one hundred and seventy while a VLAN in the network 32 also has an ID of one hundred and seventy. However, the system described herein provides a mechanism for providing unique enhanced VLAN names to each VLANs in each of the different networks.

Figure 5:
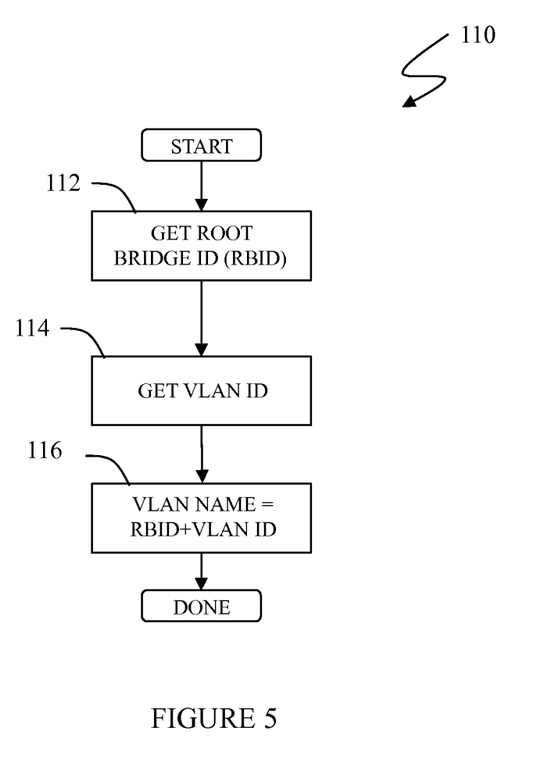
FIG. 5 is a flow diagram illustrating steps performed in connection with generating a unique VLAN name according to an embodiment of the system described herein.

Referring to FIG. 5, a flow diagram 110 illustrates a basic mechanism for providing enhanced VLAN names that are unique across an entire system having a number of networks. Processing begins at a first step 112 where a root bridge ID (RBID) for a network is obtained. As discussed elsewhere herein, the conventional spanning tree protocol provides for a single root bridge for each network. Following the step 112 is a step 114 where the VLAN ID is obtained. Following the step 114 is a step 116 where the VLAN ID is appended to the root bridge ID to form a unique VLAN name. Note that the root bridge ID for each of the networks 31-36 is unique because, inter alia, the root bridge ID includes the MAC address of the root bridge device. Thus, the VLAN name assigned to a particular VLAN, which includes the RBID, is also unique. Following the step 116, processing is complete.

Figure 6:
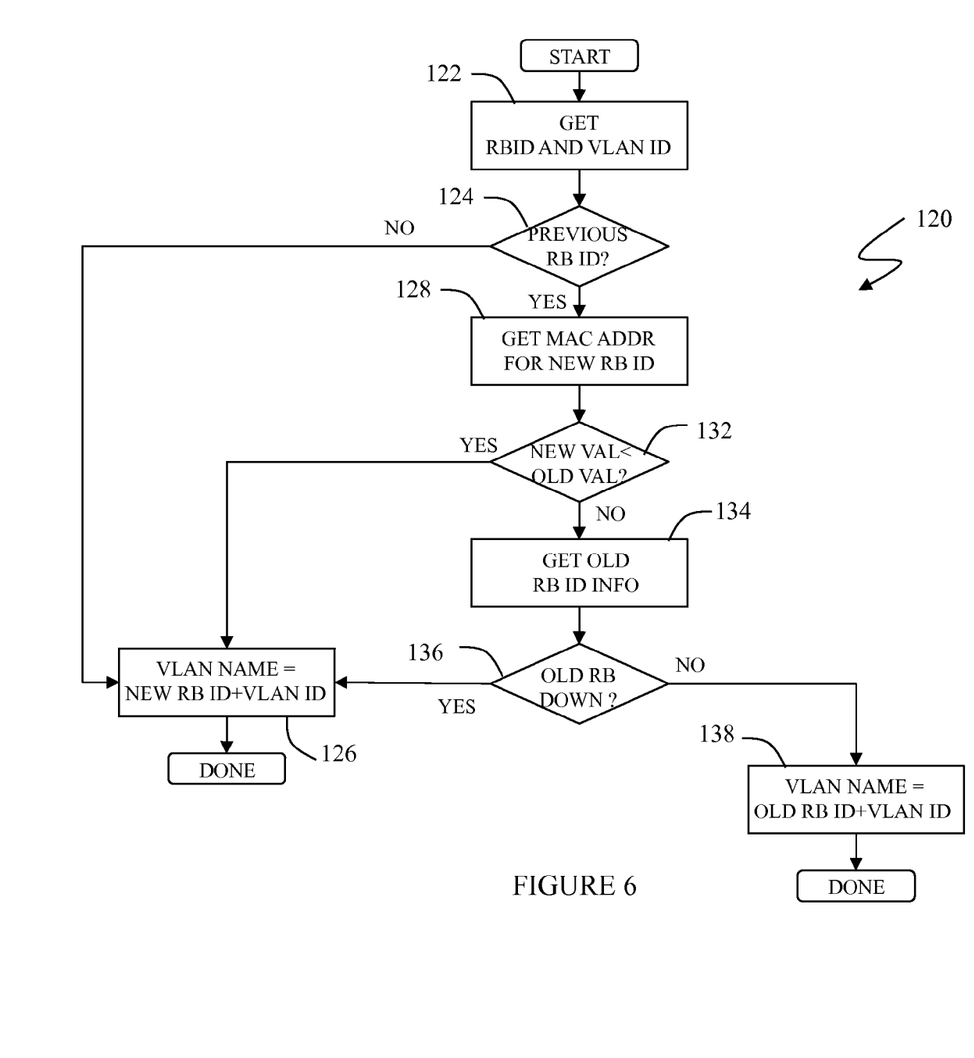
FIG. 6 is a flow diagram illustrating steps performed in connection with generating a unique VLAN name in connection with switching root bridge devices according to an embodiment of the system described herein.

Referring to FIG. 6, a flow diagram 120 illustrates processing performed in connection with determining a unique VLAN name when the root bridge device changes either because the network topology changes and/or because the root bridge device fails. Processing begins at a first step 122 where the root bridge ID and the VLAN ID are obtained as described elsewhere herein. Following the step 122 is a test step 124 where it is determined if there is a previous root bridge ID that is different. If not, then processing proceeds to a step 126 where the unique VLAN name is set to the concatenation of the root bridge ID and the VLAN ID. Note that the processing at the step 122, 126 corresponds to processing described above in connection with the flow diagram 110 of FIG. 5.

If it is determined at the test step 124 that there is a previous root bridge that is different from the current root bridge, then control transfers from the test step 124 to a step 128 where the MAC address of the new (current) root bridge is obtained. Conventionally, the determination of whether a device (switch) becomes a root bridge depends, in part, on the MAC address of the device. Generally, a switch having lowest priority value becomes a root bridge. However, if two switches have the same priority value, then the one of the two switches with a lowest MAC address becomes the root bridge. Effectively, for each device a value corresponding to the concatenation of the priority and MAC address is determined and that value is used for comparison to find the device with the lowest value.

Following the step 128 is a test step 132 where it is determined if the new value corresponding to the new (current) root bridge is less than the old value corresponding to the previous root bridge. If so, then the new root bridge remains as the current root bridge and processing proceeds to the step 126, discussed above, where the unique VLAN name is set to the concatenation of the current root bridge ID and the VLAN ID. Following the step 126, processing is complete.

If it is determined at the step 132 that the new value corresponding to the new (current) root bridge is not less than the old value corresponding to the previous root bridge, then processing proceeds to a step 134 where information for the old root bridge is obtained. The information obtained at the step 134 includes information used to reinstate the old (previous) root bridge. Following the step 134 is a test step 136 where it is determined if the old root bridge is down (non-operational). If so, then the new root bridge remains as the current root bridge and processing proceeds to the step 126, discussed above, where the unique VLAN name is set to the concatenation of the current root bridge ID and the VLAN ID. Following the step 126, processing is complete.

If it is determined at the test step 136 that the old root bridge is not down (i.e., is operational), then the new root bridge is replaced with the old root bridge. Processing proceeds to a step 138 where the unique VLAN name is set to the concatenation of the old root bridge ID and the VLAN ID. Following the step 138, processing is complete.

Note that, since the root bridge ID is appended to the VLAN ID, it is possible to have more than 4096 total VLANs in the system 30. Of course, if only twelve bits are used for VLAN IDs, then each of the networks 31-36 may be constrained to less than 4096 VLANs.

The system described herein may be used with any type of network and networking components capable of providing the functionality described herein. Although the system is illustrated herein using the root bridge ID, it is possible to use a different identifier that is unique to each network instead. The system described herein may be implemented using a computer program product/software provided in a non-transitory computer-readable storage medium (e.g., a fixed computer-readable storage medium) and executed on one or more processors.

While the invention has been disclosed in connection with various embodiments, modifications thereon will be readily apparent to those skilled in the art. Accordingly, the spirit and scope of the invention is set forth in the following claims.

What is claimed is:

1. A method of routing data in a system containing a plurality of networks and a plurality of devices, comprising:
    obtaining, for each of the plurality of networks, a unique identifier associated with respective ones of the plurality of networks, wherein the unique identifier associated with respective ones of the networks includes a root bridge ID for a root bridge uniquely associated with respective ones of the plurality of networks;
    obtaining a VLAN ID for at least one VLAN in each of the plurality of networks;
    forming, for each of the plurality of networks, a unique VLAN name by concatenating the respective unique identifier to the VLAN ID, wherein, in response to a change in topology, a new root bridge is determined and, in response to a value for the new root bridge being less than a value for the old root bridge, the unique VLAN name is changed to remove the old root bridge ID and to include the new root bridge ID; and
    routing data through the system to provide communication between devices that are part of the same VLAN in different ones of the plurality of networks.

2. The method, according to claim 1, wherein, in response to a root bridge becoming non-operational, a new root bridge is determined and the unique VLAN name is changed to remove the old root bridge ID and to include the new root bridge ID.

3. The method, according to claim 1, wherein a unique VLAN name is provided for all of the VLANs in the system.

4. The method, according to claim 3, wherein there are at least 4096 different discoverable VLANs in the system.

5. The method, according to claim 4, wherein each of the networks includes less than 4096 VLANs and wherein at least one of the networks has at least one VLAN.

6. An article of manufacture, comprising:
    a non-transitory computer-readable media containing software that provides unique VLAN names in a system containing a plurality of networks and a plurality of devices, the software comprising:
    executable code that obtains, for each of the plurality of networks, a unique identifier associated with respective ones of the plurality of networks, wherein the unique identifier associated with respective ones of the networks is a root bridge ID for a root bridge uniquely associated with respective ones of the networks;
    executable code that obtains a VLAN ID for at least one of the VLANs in each of the plurality of networks;
    executable code that forms, for each of the plurality of networks, a unique VLAN name by concatenating the unique identifier to the VLAN ID, wherein, in response to a change in topology, a new root bridge is determined and, in response to a value for the new root bridge being less than a value for the old root bridge, the unique VLAN name is changed to remove the old root bridge ID and to include the new root bridge ID; and
    executable code that routes data through the system to provide communication between devices that are part of the same VLAN in different ones of the plurality of networks.

7. The article of manufacture according to claim 6, wherein, in response to a root bridge becoming non-operational, a new root bridge is determined and the unique VLAN name is changed to remove the old root bridge ID and to include the new root bridge ID.

8. The article of manufacture according to claim 6, wherein a unique VLAN name is provided for all of the VLANs in the system.

9. The article of manufacture according to claim 8, wherein there are at least 4096 different discoverable VLANs in the system.

10. The article of manufacture according to claim 9, wherein each of the networks includes less than 4096 VLANs and wherein at least one of the networks has at least one VLAN.

* * * * *